Jan. 26, 1954

H. R. WATSON ET AL 2,667,315

BALANCING OF AIRCRAFT CONTROL COLUMNS

Filed July 18, 1951

2 Sheets-Sheet 1

INVENTORS
H. R. WATSON
J. MORRIS
H. J. STAITE
By Mawhinney + Mawhinney
ATTYS.

Patented Jan. 26, 1954

2,667,315

UNITED STATES PATENT OFFICE 2,667,315

BALANCING OF AIRCRAFT CONTROL COLUMNS

Henry Romaine Watson, John Morris, and Harold James Staite, Coventry, England, assignors to Sir W. G. Armstrong Whitworth Aircraft Limited, Baginton, England Application July 18, 1951, Serial No. 237,398

Claims priority, application Great Britain October 28, 1950

9 Claims. (Cl. 244—83)

1

This invention relates to an aircraft control column (e. g., with aileron wheel) such as is pivotally mounted near its lower end for fore-and-aft movement—i. e., for actuating the aircraft elevator.

The normal control column, especially in the case of an aircraft with dual control, exerts considerable weight moments about its pivot, these moments being caused by a change of attitude of the aircraft pitch and by fore-and-aft movement of the column for operation of the aircraft elevator. It is, however, desirable to balance these moments, as otherwise they tend to destabilize the aircraft in pitch. A further increase in stability can be provided by over-balance.

Whereas from a theoretical point of view a simple method of balancing the column statically would be by means of a weight fast with the column below its pivot, this is not convenient in practice, as the distance from the pivot at which such a weight can operate is limited by the lower surface of the aircraft and adjacent structure, in consequence of which the balance weight to be satisfactory would have to be undesirably great.

Nor is it possible to meet this difficulty by means of a geared balance weight having a ratio of, say, $a/b$; as it can be shown mathematically that the weight required to balance an attitude change is $a/b$ times the weight required to balance a fore-and-aft movement of the column, and obviously no single weight will fulfill both functions.

Our object is to meet this difficulty in a simple manner.

According to the invention, the control column has connections with at least two balance weights which are arranged so that their effects will be additive for balancing against attitude change, and subtractive for balancing against fore-and-aft column movement.

Preferably each of the weights has a geared connection with the column, and they are conveniently arranged so that a larger of the two weights is at all times stable in normal flight conditions, the smaller of the two weights being unstable.

Figure 1:
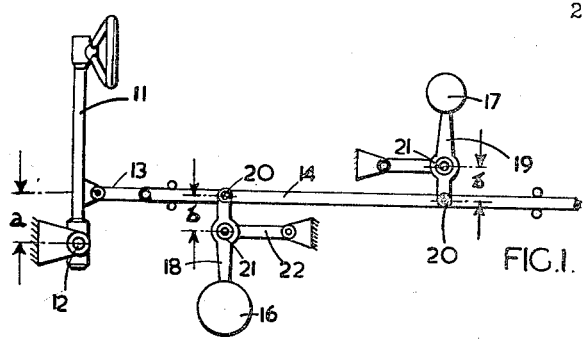
Figure 2:
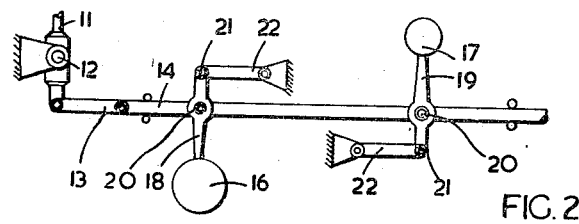
Figure 3:
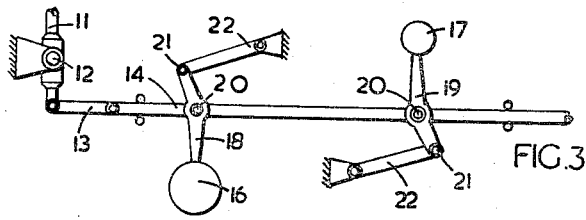
Figure 4:
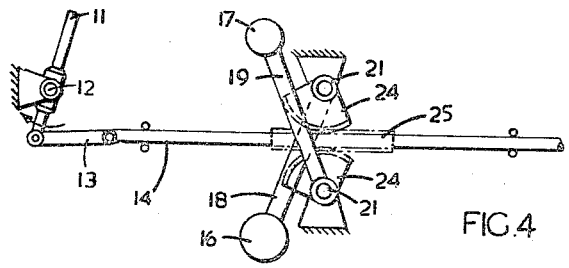
Figure 5:
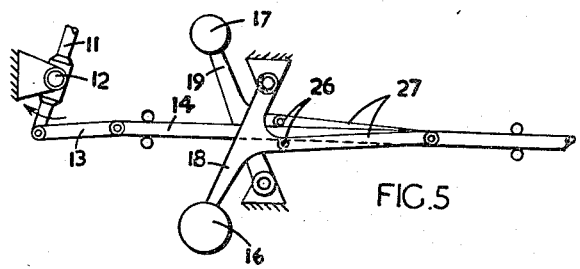
Figure 6:
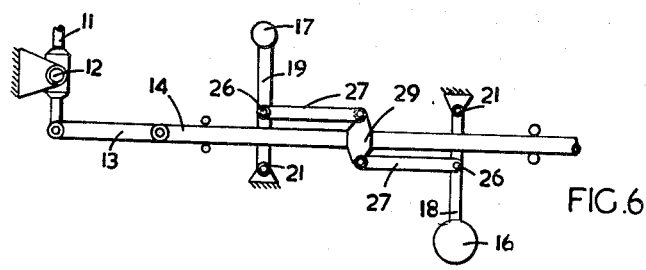
Figure 7:
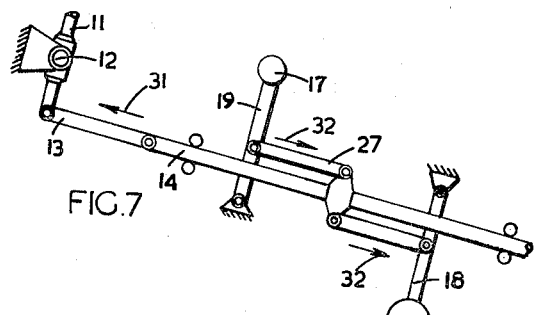
Figure 8:
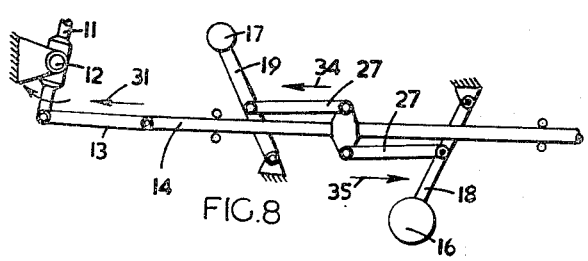

In the accompanying diagrammatic drawings:

Figures 1 to 5 show five different arrangements according to the invention, the column being in the neutral position in Figures 1 to 3, and pulled back in Figures 4 and 5; and Figure 6 shows a preferred arrangement with the column in the neutral position, Figure 7 being a similar view but with the aircraft assumed to be climbing, and Figure 8 a similar view but with the aircraft assumed to be horizontal and the column pulled back.

2

Like reference characters are used throughout the various figures to denote corresponding parts.

In the construction of Figure 1, the control column 11 is shown as being connected (at a distance $a$) above its pivotal mounting 12 to a link 13 hinged to an elevator control rod 14 which is slidably guided. Use is made of two weights 16, 17, the former predominating, fast at the ends of generally upright arms 18, 19 which are pivotally connected at 20 by their other ends to the control rod, the arm 18 carrying the greater weight 16 depending from the control rod and the other arm 19 extending upwardly therefrom. The two arms are fulcrumed (at 21) between their ends at a distance $b$ from their points of connection to the control rod, to provide a desired gear ratio $a/b$. To accommodate the sliding motion of the rod the fulcrums for the two arms are carried by generally horizontal links 22.

In the converse arrangement of Figure 2, the two weight arms 18, 19 are hinged (at 20) upon the rod 14 between their ends, their other ends being fulcrumed (at 21) upon generally horizontal links 22. The control column is connected to the link 13 below its pivot 12.

It should be realised that, in the two examples described above, the changes of moment in the balance weight and in the control column are only proportional to one another for small angular displacements of the column, and in consequence the degree of balance which can be obtained is less accurate as the angle increases. Whilst, in practice, such arrangements are quite satisfactory in cases in which the displacement of a control column is not a large one, as in the case of a control column using a high gear ratio, the degree of approximation obtained in conditions of extreme displacement might not be entirely satisfactory. This objection can be avoided, however, in a number of ways, as described below.

Thus, in Figure 3 the two weight arms 18, 19 have their ends remote from the weights cranked somewhat in a direction away from the generally horizontal links 22, the latter being inclined from their pivotal supports towards the control rod 14 when the control column is in the neutral position, i. e., when the weight positions of the arms are substantially vertical.

In the alternative arangement of Figure 4, there are two similar weight arms 18, 19 pivotally mounted at 21 above and below the control rod 14 and extending across the control rod, the lower weight 16 again being the greater, and these arms 18, 19 are fast with toothed sectors 24 engaging opposite sides of a rack 25 fast with the control rod.

In a modification of this latter arrangement, as shown by Figure 5, the two weight arms 18, 19 are hinged at 26, to the ends of similar links 27, on those sides of the control rod 14 at which the weights are, the links 27 being inclined at only a small angle to the control rod and having their other ends hinged thereto.

In the preferred arrangement of Figure 6, the two weight arms 18, 19 are arranged and connected with the control rod 14 substantially as disclosed by Figure 5, except that in Figure 6 the links 27 are parallel to the control rod when the control column 11 is in the neutral position, the other ends of the links being hinged to a bracket 29 which is fast with the control rod.

The arrangements of Figures 4, 5 and 6 each have the advantage over those of Figures 1 to 3, that no unwanted transverse load is applied to the control rod such as might tend to bend it.

With all the constructions shown, the effect of both weights 16, 17 is additive against attitude change; but fore-and-aft displacements of the column are balanced to a greater or less extent by the effective difference between the two weights, as the smaller weight 17 (on the upwardly-extending arm 19) is unstable. This is depicted by the various arrows shown in Figures 7 and 8.

Thus, in Figure 7, in which there has been a change of attitude, the force exerted on the control rod 14 by the control column is indicated by the arrow 31, and the counter forces, exerted by the weights 16 and 17, are indicated by the arrows 32 as acting on the control rod 14 in the same direction, opposite to the direction of the arrow 31. In Figure 8, however, showing the position of the parts when the control column is tilted backwards, thereby again applying a force to the control rod 14 in the direction indicated by the arrow 31, the weight 17 applies a force in the same direction, as indicated by the arrow 34, whereas the heavier weight 16 applies a force, indicated by the arrow 35, in the opposite direction.

It should be understood that the weights can be arranged not merely to provide substantially complete balance, but to provide over-balance. Since the sum of the two weights controls the attitude balance, and their difference controls the balance of column movement relatively to the aircraft, it is possible to arrange the parts so as to vary either effect separately. Thus, the parts can be arranged so as to provide an increased attitude effect, i. e., to provide over-balance in the case of attitude change, and to leave the difference of the weights unchanged so as to provide substantially correct balance against column displacement. This difference would, of course, only be constant in the case in which the gear ratios (a/b) are the same for both the weights.

The effect of attitude over-balance is somewhat similar to a positive, aero-dynamic, hinge moment co-efficient which causes the elevator to float against the wind with change of incidence—usually referred to mathematically as "positive $b_1$." The aero-dynamic co-efficient, however, is independent of speed, whereas the weight simulates a co-efficient which becomes relatively larger as the aircraft speed diminishes, inasmuch as the air forces will decrease as the square of the speed. In consequence, the stabilizing effect of attitude over-balance will increase as the aircraft speed decreases. This effect is highly desirable in the case of an aircraft with an engine-propeller power unit, as it helps to compensate for the de-stabilizing effects of the unit, which increase with diminishing speed.

What we claim as our invention and desire to secure by Letters Patent of the United States is:

1. The combination with an aircraft control column pivotally mounted near its lower end for fore-and-aft movement and connected to operate a control rod for moving a control surface of the aircraft, of a pendulum and an inverted and lighter pendulum both fulcrumed relatively to the fixed structure of the aircraft, and a driving interconnection between each pendulum and said control rod, said interconnections causing said pendulums to apply a force proportional to the difference between their moments for opposing a force applied to said control rod by a moment due to a movement in the fore-and-aft direction of said column from its neutral position, and said interconnections causing said pendulums to apply a force proportional to the sum of their moments for opposing a force in said control rod when the aircraft is displaced from the horizontal and carries the control column out of the vertical.

2. The combination with an aircraft control column pivotally mounted near its lower end for fore-and-aft movement and pivotally connected to operate an axially movable control rod for moving a control surface of the aircraft, of a normal pendulum and an inverted and lighter pendulum both fulcrumed relatively to the fixed structure of the aircraft, and a driving interconnection between each pendulum, remotely from its fulcrum, and said control rod, said interconnections angularly displacing said pendulums in opposite senses when said control column is moved angularly relatively to said control rod for moving the latter axially, whereby said pendulums apply to said control rod a force proportional to the difference between their moments for opposing a force applied to said control rod by the moment of said column, and said interconnections transmitting from said pendulums to said control rod a force proportional to the sum of their moments for opposing a force in said control rod when the aircraft is displaced from the horizontal and carries the control column out of the vertical.

3. The combination with an aircraft control column pivotally mounted near its lower end for fore-and-aft movement and pivotally connected to operate an axially movable control rod for moving a control surface of the aircraft, of a normal pendulum and an inverted and lighter pendulum both fulcrumed relatively to the fixed structure of the aircraft, the pendulums being parallel to each other and to the control column in the neutral position of the latter, and a driving interconnection between each pendulum, remotely from its fulcrum, and said control rod, said interconnections angularly displacing said pendulums in opposite senses when said control column is moved angularly from its neutral position for moving the control rod axially, whereby said pendulums apply to said control rod a force proportional to the difference between their moments for opposing a force applied to said control rod by the moment of said column, and said interconnections causing said pendulums, when the aircraft is displaced from the horizontal and carries the control column and pendulums out of the vertical, to apply a force proportional to the sum of their moments for opposing a force due to the moment of said control column in said control rod.

4. The combination with an aircraft control column pivotally mounted near its lower end for fore-and-aft movement and pivotally connected to operate an axially movable control rod, of a normal pendulum and an inverted and lighter pendulum both fulcrumed relatively to the fixed structure of the aircraft, the pendulums being parallel to each other and to the control column in the neutral position of the latter, and a driving interconnection between each pendulum, remotely from its fulcrum, and said control rod, said interconnections angularly displacing said pendulums in opposite senses when said control column is moved angularly from its neutral position for moving the control rod axially, whereby said inverted pendulum applies to said control rod a force acting in the same direction as a force in said control rod due to the moment of said column, and whereby said normal pendulum applies to said control rod a force acting in opposition to the said force in said control rod due to the moment of said control column, the algebraic sum of the forces in said control rod due to both pendulums opposing the force in said rod due to said moment of said control column, said interconnection of said inverted pendulum, when the aircraft is displaced from the horizontal and carries the control column out of the vertical, reversing the action of said inverted pendulum to apply a force to said rod, which force in conjunction with that applied by said normal pendulum opposes the force in said rod due to the column not being vertical.

5. The combination with an aircraft control column pivotally mounted near its lower end for fore-and-aft movement, of a generally horizontal control rod which is for moving a control surface of the aircraft and which is connected to said column to be slid thereby, a normal pendulum and an inverted pendulum the weight of one of which is arranged below and the weight of the other of which is arranged above said control rod, the arms of said pendulums extending substantially at right-angles to said control rod in a generally vertical plane when said column is in the neutral position, and means on relatively fixed structure providing fulcrum points for said arms, said pendulum arms having connections with said control rod such that said arms will be simultaneously turned in opposite directions about their respective fulcrum points to apply oppositely acting forces to said control rod when said control rod is slid in either direction.

6. The combination with an aircraft control column pivotally mounted near its lower end for fore-and-aft movement, of a generally horizontal control rod which is for moving a control surface of the aircraft and which is connected to said column to be slid thereby, a normal pendulum and an inverted and lighter pendulum, the pendulum arms extending substantially at right-angles to said control rod in a generally vertical plane when said column is in the neutral position, with the bob of the normal pendulum below and the bob of the inverted pendulum above said control rod, and means on relatively fixed structure providing fulcrum points for said pendulum arms, said pendulum arms having connections with said control rod such that said arms will be simultaneously turned in opposite directions about their respective fulcrum points to apply oppositely acting forces to said control rod when said control rod is slid in either direction.

7. The combination with an aircraft control column pivotally mounted near its lower end for fore-and-aft movement, of a generally horizontal control rod which is for moving a control surface of the aircraft and which is connected to said column to be slid thereby, a normal pendulum and an inverted pendulum both fulcrumed relatively to the fixed structure of the aircraft, the weight of one of which is arranged below and the weight of the other of which is arranged above said control rod, the arms of said pendulums being in a generally vertical plane and pivotally mounted on opposite sides of said control rod, said arms extending substantially at right-angles to said control rod when said column is in the neutral position, and said arms connected with said control rod by links such that said arms will be simultaneously turned in opposite directions about their respective fulcrum points to apply oppositely acting forces to said control rod when said control rod is slid in either direction.

8. The combination with an aircraft control column pivotally mounted near its lower end for fore-and-aft movement, of a generally horizontal control rod which is for moving a control surface of the aircraft and which is connected to said column to be slid thereby, a normal pendulum and an inverted and lighter pendulum, the pendulum arms extending substantially at right-angles to said control rod in a generally vertical plane when said column is in the neutral position, said pendulum arms pivotally mounted relatively to the fixed structure of the aircraft above and below said control rod, and means connecting said arms with said control rod such that said arms will be simultaneously turned in opposite directions about their respective pivotal mountings to apply oppositely acting forces to said control rod when said control rod is slid in either direction.

9. The combination with an aircraft control column pivotally mounted near its lower end for fore-and-aft movement, of a generally horizontal control rod which is for moving a control surface of the aircraft and which is connected to said column to be slid thereby, a normal pendulum and an inverted pendulum the weight of one of which is arranged below and the weight of the other of which is arranged above said control rod, the arms of said pendulums being pivoted on said control rod and extending substantially at right-angles to said control rod in a generally vertical plane when said column is in the neutral position, and links fulcrumed relatively to the fixed structure of the aircraft providing fulcrum points for said arms whereby said arms will be simultaneously turned in opposite directions about their respective fulcrum points to apply oppositely acting forces to said control rod when said control rod is slid in either direction.

HENRY ROMAINE WATSON.
JOHN MORRIS.
HAROLD JAMES STAITE.

References Cited in the file of this patent
UNITED STATES PATENTS

| Number | Name | Date |
|---|---|---|
| 497,670 | Kroll | May 16, 1893 |
| 829,355 | Schluter | Aug. 21, 1906 |
| 1,154,396 | Hayot | Sept. 21, 1915 |
| 1,561,793 | Mitton | Nov. 17, 1925 |
| 1,855,578 | Boykow | Nov. 1, 1932 |
| 2,092,424 | Potez | Sept. 7, 1937 |
| 2,366,995 | Aulin | Jan. 9, 1945 |
| 2,432,005 | Gwinn, Jr. | Dec. 2, 1947 |